United States Patent [19]

Holroyd et al.

[11] Patent Number: 4,602,973
[45] Date of Patent: Jul. 29, 1986

[54] MANUFACTURE OF NON-WOVEN FABRIC

[75] Inventors: Eric Holroyd, near Knutsford; Henry A. Gardner, Mawdesley; Ronald W. Jones, Liverpool, all of England

[73] Assignee: Apsley Metals Limited, United Kingdom

[21] Appl. No.: 731,721

[22] Filed: May 8, 1985

[30] Foreign Application Priority Data

May 22, 1984 [GB] United Kingdom ............... 84 13092

[51] Int. Cl.$^4$ ......................... B65H 81/00; D04H 3/04
[52] U.S. Cl. .................................... 156/177; 156/181; 156/437; 156/439
[58] Field of Search ............... 156/177, 181, 441, 436, 156/437, 439, 440; 78/101; 66/84 A

[56] References Cited

U.S. PATENT DOCUMENTS

| | | | |
|---|---|---|---|
| 2,139,840 | 12/1938 | McKone | 154/14 |
| 3,422,511 | 1/1969 | Seguin | 156/439 |
| 3,593,394 | 7/1971 | Bolles | 156/440 |
| 3,649,411 | 3/1972 | Bolles | 156/440 |
| 3,921,265 | 11/1975 | Eschenbach | 156/440 |
| 4,242,779 | 1/1981 | Cuninier et al. | 156/439 |

FOREIGN PATENT DOCUMENTS

| | | |
|---|---|---|
| 1052883 | 12/1966 | United Kingdom . |
| 1153493 | 5/1969 | United Kingdom . |
| 1264092 | 2/1972 | United Kingdom . |
| 1265123 | 3/1972 | United Kingdom . |
| 1311693 | 3/1973 | United Kingdom . |
| 1319205 | 6/1973 | United Kingdom . |

Primary Examiner—Michael Ball
Attorney, Agent, or Firm—Stevens, Davis, Miller & Mosher

[57] ABSTRACT

Apparatus for the manufacture of fabric, especially tire building fabric ply material, in which a pair of rotatable parallel spindles are each surrounded by a helical member rotatable in the opposite direction to the respective spindles. The opposite rotation of the spindles and the helical members helps to ensure a uniform winding as fabric is built up from filamentary material applied around the spindles from a feeding head rotating around the spindles.

12 Claims, 6 Drawing Figures

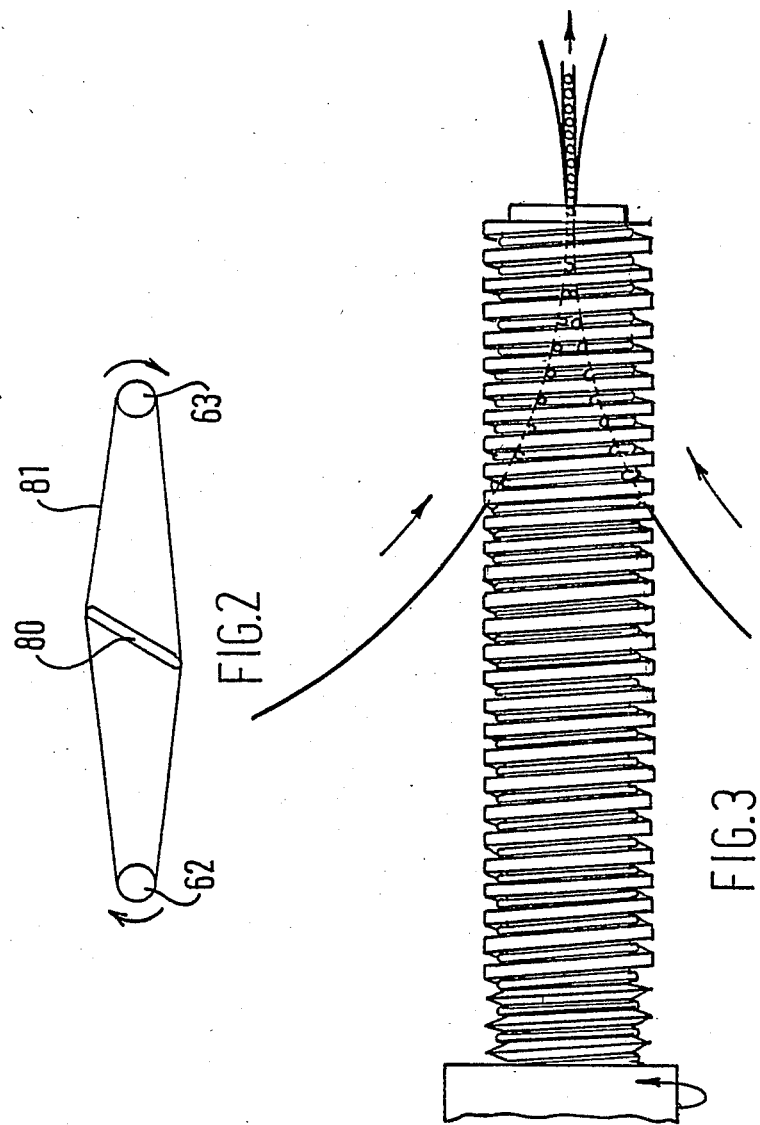

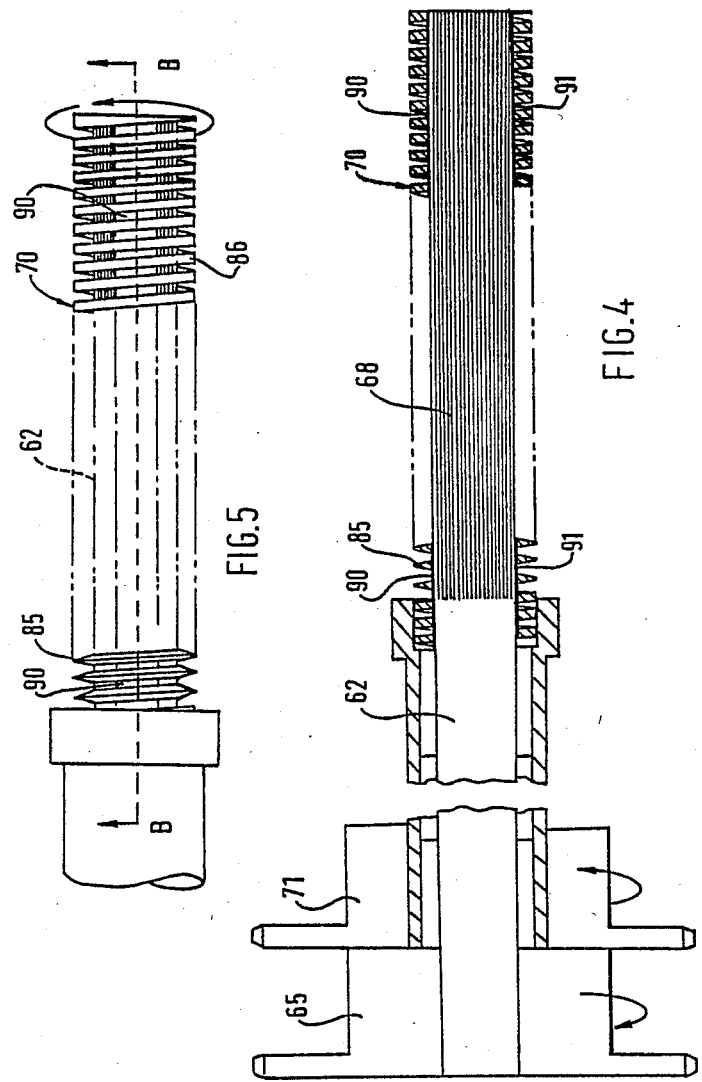

MANUFACTURE OF NON-WOVEN FABRIC

This invention relates to the manufacture of fabric, in particular radial tire carcass reinforcement fabric.

The carcass reinforcement of a radial tire comprises one or more plies of weftless fabric which, in the shaped tire, has all the reinforcement cords lying in substantially radial planes so that each cord of the fabric extends from tire bead to tire bead around the tire cross-section. The ply material before shaping into the toroid of the shaped tire comprises an elongated sheet or strip of fabric having mutually parallel reinforcement cords laid across it at 85°–90° to the length of the sheet. Such material is made by forming an elongated sheet with the cords parallel to the length of the sheet and embedded in rubber compound, then bias cutting this into short lengths. The resultant material has cut edges, with each reinforcement cord having a cut end at each edge of the sheet.

The assembly of the cords and embedding in rubber compound is carried out on large and extremely expensive calender machines which arrange the cord assembly and apply rubber compound to the assembly of cords as it passes through the nip of a pair of large, accurately machined, rollers.

The cords of the reinforcement fabric may be steel or textile but in either case it is essential for the quality of the finished tire that each cord in the completed fabric is accurately positioned so that it has the same length as every other cord from tire head to tire bead in the assembled tire. Accordingly each cord needs to be laid at precisely the same tension and straightness and the twist of each cord lying in the fabric has to be identical. Furthermore, particularly with steel cords, it is important that adequate rubber penetration is obtained into the cord assembly.

It is these strict requirements for the accuracy of the fabric that have caused the industry to use the expensive, very large, calender system for assembling ply material and it is an object of the present invention to provide a much smaller and cheaper machine and process for manufacturing tire carcass fabric of the required quality and consistency.

According to one aspect of the present invention apparatus for the manufacture of fabric comprises a pair of longitudinally-extending spindles mounted in spaced-apart, parallel relationship one for each edge of the fabric, a filament feeding head, means for rotating the feeding head around the pair of spindles so as to form a winding of filamentary material around the spindles, a pair of helical members being provided, one helical member surrounding each spindle, the helical members being rotatable around the respective axes of the spindles simultaneously to move the winding along both spindles in synchronisation, means for driving the spindles in the opposite directions of rotation about their axes to those of the respective helical members, and means for applying adhesive material to the winding of filamentary material to form a sheet of fabric.

The winding may comprise filamentary material in the form of tire reinforcement cord, and the adhesive material may be unvulcanised natural or synthetic rubber.

The spindles preferably each comprise a rod having a knurled cord-supporting cylindrical surface.

The helical members are preferably rotated in the same direction and have the same direction of helix angles so that the cord winding has all the cords parallel to one another.

A means of controlling the winding tension is to provide between the two rods a cam or finger to extend the cord loop in the plane of the winding head so that the last winding or windings is/are always slightly larger in path length than the path length required for windings further along the rods. This relieves the tension along the rods and assists in creating a uniform winding of tire reinforcement cord.

The rods may be supported only at the driving end, adjacent the plane of the cord winding head, the free ends of the rods being arranged one at each side of the rubbering unit but unsupported thereby. Alternatively, the ends of the rods adjacent to the fabric output and rubbering unit may be engaged in the rubbering unit so that the pair of rods are located in their respective fabric edge positions. Driving means for the rods and the helical members may comprise sprocket wheels and chains driven by a suitable motor or motors.

The cord feeding head preferably comprises a cord feed guide, which may be a pulley or a cord guide ring, mounted on an arm rotatable around the pair of cord holding members.

The arm may be mounted at one end on a hollow shaft rotatably mounted in a bearing coaxial with the centre line of the fabric sheet being manufactured and the arm then has its outer end arranged to rotate around the spindles to wrap the cord around them. Guides may be mounted adjacent to the helical members to positively locate the cord into the first turns of the helices. The cord feed to the machine may feed cord through the hollow shaft, and along the arm to a pulley at the outer end of the arm.

The cord feed to the arm is preferably a constant tension cord feed device and may or may not include a compensator to allow for the irregular rate of feed required by the winding head.

The means for applying rubber compound may comprise a pair of flat platens one above and one below the fabric sheet between the spindles and a feed roller for a thin sheet of rubber compound so that the platens press rubber into the cord assembly stepwise. Then, once the edge loops of cord are detached from the cord holding members second press units may be provided to rubber the fabric edges. The platens may be moved at an angle to the vertical so as to enable a 'nudging' action to take place which permits adjustment of the resultant cord spacing.

Preferably, however, the means for applying rubber compound may comprise a pair of calender rolls one above and one below the assembly of cords which 'friction' rubber into the cord assembly across the full width between the spindles. The rubber may be supplied as sheet, from stock rolls, or a four-roll calender may be used to form the rubber layers from a supply of unvulcanised rubber pellets or strip stock.

Means may be provided to trim the fabric edges to form a cut-edge fabric or the fabric may be kept with looped edges, means being provided to coat the looped edges with rubber after the main body of the fabric has emerged from the calender.

According to another aspect of the present invention a method for the manufacture of fabric comprises winding filamentary material around a pair of spaced-apart, longitudinally-extending rotating spindles, driving both edges of the winding along the spindles by means of helical members rotating around the spindles in the opposite direction of rotation to that of the spindles, applying adhesive material to the filamentary material, consolidating the winding and adhesive material to form a sheet of fabric and removing the fabric from the spindles.

In the method defined in the preceding paragraph the filamentary material may be tire cord and the adhesive material may be unvulcanised natural or synthetic rubber.

Further aspects of the method and apparatus will become apparent from the following description, by way of example only, of one embodiment of the invention in conjunction with the attached diagrammatic drawings in which:

FIG. 2 is a detail of the apparatus of FIG. 1, viewed in the direction of the arrow 'A';

FIG. 3 is a side elevation showing part of the apparatus of FIG. 1;

FIG. 4 is a similar view to FIG. 3, partly in cross-section on the line B—B of FIG. 5, showing a detail of a helical member, FIG. 5 is a plan view showing further detail of a helical member and spindle.

Figure 1:
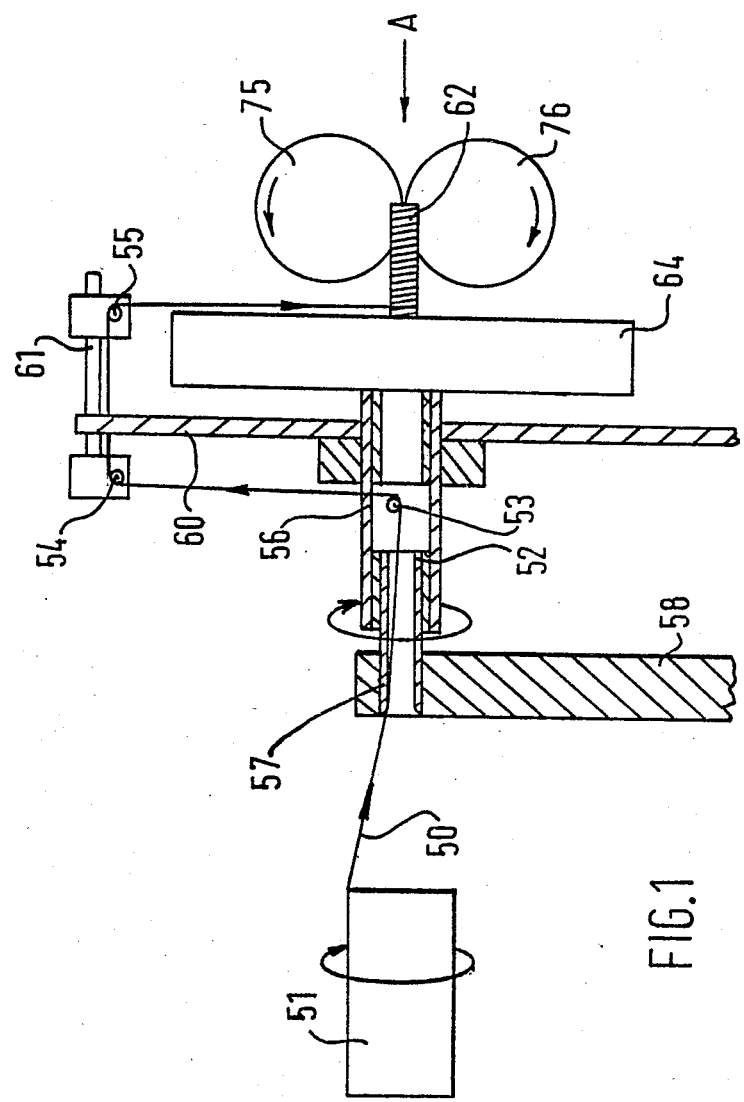
FIG. 1 is a side elevation of a tire ply manufacturing apparatus.

As shown in FIG. 1, cord 50 from a spool or 'cheese' 51 is drawn through a hollow shaft 52 and around pulleys 53,54, 55 associated with a rotatable arm 60 and extension 61, the pulley 55 constituting a cord feeding head. The arm 60 is rotatably mounted on a hollow shaft 56 to which the arm 60 is secured so as to be drivable with the shaft 56 around a fixed support shaft 57 carried in a main support frame 58. The cord is wound by rotating the feeding head around a pair of parallel spindles 62 and 63 which are rotatably mounted in a support frame 64 and driven by means of sprockets 65 and associated chains (not shown) which are driven from a sprocket (also not shown) carried by the hollow shaft 56. The direction of rotation of the spindles 62,63, viewed as indicated by the arrow 'A', is anti-clockwise, and the direction of rotation of the cord feeding head is clockwise.

The spindles 62 and 63 are knurled as indicated at 68 in FIG. 4, and the effect of the rotation of the spindles in the opposite direction to that of the cord winding head is therefore to tend to unwind the cord as it is frictionally engaged by the knurled surface, thus tending to reduce the tension in the winding. The effects of reverse rotation of the spindle relative to that of the feeding head 50, and rotation of helical members oppositely to the spindles, may be controlled by varying the relative speeds of the spindle, head and helical member to produce the best results in uniformity of the resulting cord winding.

Each spindle 62,63 is surrounded by a helical member 70 which is drivable by a sprocket 71 independently of the spindle, and is arranged to rotate in the opposite direction to the associated spindle to carry the winding to the right (as seen in FIG. 1) at a speed which is synchronised to the speed of rotation of the cord feeding head so that the winding progresses at the required speed as it is formed. The helical members 70 operate to move the cord winding along the spindles 62 and 63 towards a pair of rolls 75,76 which are fed from stock rolls, not shown, with thin unvulcanised sheet rubber, either cold or pre-heated, to be applied to the upper and lower surfaces of the cord winding in the nip between the rolls 75,76. The sheet rubber is normally interleaved with a strippable plastic liner; alternatively it may be supported on the surface of an endless belt in its passage to the rolls 75,76.

Figure 6:
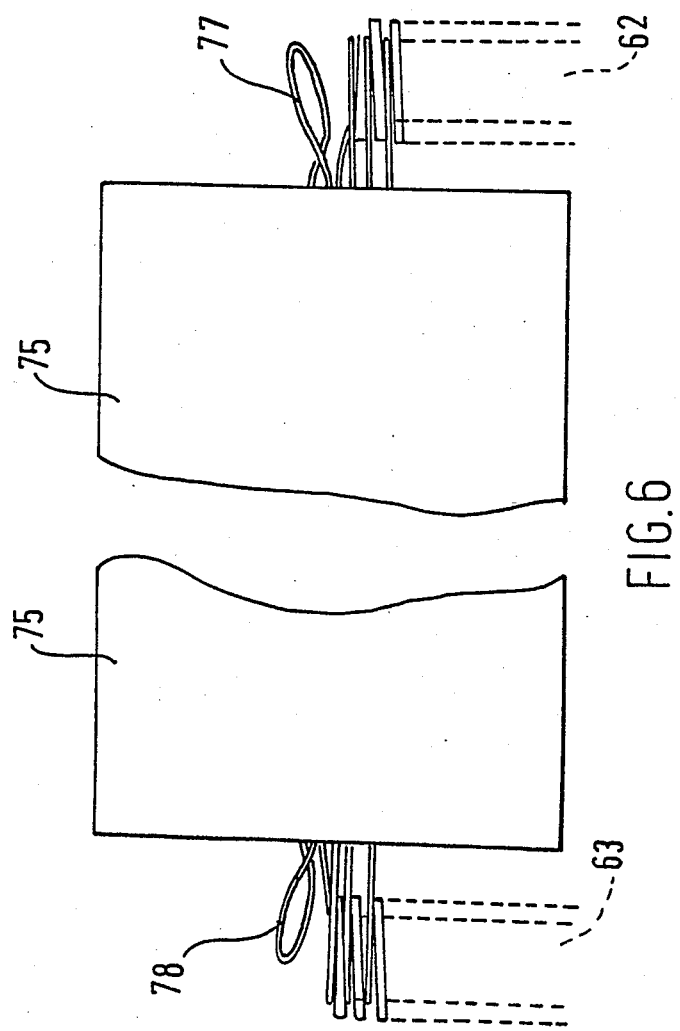
FIG. 6 is a plan view showing parts of the cord winding and rubbering apparatus of FIGS. 1-5.

The spindles 62,63 are spaced-apart more widely than the width of the rolls 75,76 and the arrangement is such that the winding leaves the spindles as it passes continuously into the nip, the coated fabric leaving the nip then having loops 77,78 of un-rubbered cord protruding from the side (see FIG. 6). These loops can then either be trimmed off or may be coated with rubber in a further calendering stage to produce a looped-edge cord ply. In the latter case, the loops may be straightened before applying the rubber to the loops.

As shown in FIG. 2, a cam member 80 may be positioned in the plane of the winding head to extend the adjacent cord loop 81 so as to help to reduce the tension which is set up as the winding progresses along the helical members and requires additional cord to accommodate the axial movement of the loops.

The helical members 70 are each formed with an apex thread 85 in the region of the winding head so as to assist in the smooth reception of the cord loop 81, but the major portion 86 of the thread is of square profile. The members 70 are of steel and may be produced from solid bar stock by a boring and screw-turning operation which leaves the screw thread portions 85,86 integral with a thin central tube of slightly larger internal diameter than that of the spindle 62,63. The central tube is then partly cut-away, leaving only two narrow, circumferentially spaced thin, tie bars 90,91 which extend along the whole operative length of the member 70 at the root of the screw thread and on diametrically opposite sides of the screw axis.

The tie bars 90,91 have an important function in preventing the cord tension from distorting the helical member 70 and thus altering the pitch of the screw threads 85,86 as the cord windings travel along the spindles 62,63. This had proved to be a serious problem with previous helical members in the form of helical coils which did not have tie members between adjacent turns, and whilst it was undesirable to introduce any interruption in the smooth engagement of the helical turns with the cord on the spindle it has been found that tie bars 90,91 as shown can be made sufficiently thin and of sufficiently limited width to enable the passage of the cord around and along the spindle to be substantially undisturbed by the presence of the tie bars. The spindle remains in frictional contact with the cord through the gaps between the tie bars.

Rotation of the support frame 64 about the longitudinal axis of the machine may conveniently be resisted by engagement of a suitable fixed abutment (not shown) with the outer surface of one of the helical members, in a position to the right-hand side of the winding plane as seen in FIG. 1, i.e. where it will not interfere with the rotation of the arm 60 and the associated mechanisms and cord windings.

In order to prevent twist building up in the cord as it is fed via the feeding head 55 to the spindles, the cheese 51 and shaft 52 are rotated in the same direction as the arm 60. The cheese 51 may be carried on a turret or magazine holding a number of cheeses arranged to be suitably connected and replenished to permit uninterrupted operation of the machine.

Cord spacing in the resultant fabric is primarily controlled by the pitch of the helical member, the cord spacing being half the pitch of the helical member. However, a limited adjustment of cord spacing may be achieved by altering slightly the speed of the rolls 75,76; for example a reduction in the speed of the rolls causes a reduction in the cord spacing since the relative rate of feed of the wound material into the nip is effectively increased.

In the apparatus illustrated, the directions of rotation of the winding head and the helical members are similar and in the opposite sense to the direction of rotation of the spindles. It may be possible, e.g. by reversing the hand of the screw threads of the helical members, to operate the apparatus with the winding head rotating in the opposite direction to the direction of rotation of the helical members, but the essential feature is that the helical members rotate in the opposite directions to their respective spindles.

The apparatus in accordance with the invention may be used with any of the usual tire cord materials, including textile and steel cord, and for any width of conventional tire ply material where the cord lay angle is of the order of 90° to the longitudinal direction of the fabric.

If tire building fabric plies having a bias angle, for example 80°-85° relative to the longitudinal direction, are required it is possible to achieve the required cord lay angle by the use of a cam or finger engaging the first loop of cord as it is laid by the feeding head on one of the spindles. The winding may be arranged by this means to be displaced further to the right as seen in FIG. 1 on one spindle (which then needs to be of greater overall length than the other spindle) and proceeds as previously described with the required cord lay angle.

The apparatus according to the invention has an important novel feature in the provision of means for driving the spindles in the opposite directions of rotation to those of the respective helical members. Without this feature the cord tends to be tightened as it passes along the spindles, causing uneven winding, cord damage, and possible jamming of the machine.

A further important feature lies in the strengthening of the helical members by the provision of tie bars which prevent the adjacent turns of the screw threads from being moved towards or away from one another in the axial direction. The uniformity of the wound sheet of fabric is greatly enhanced by the provision of the tie bars.

We claim:

1. Apparatus for the manufacture of fabric comprising a pair of longitudinally-extending rotatable spindles mounted in spaced-apart, parallel relationship one for each edge of the fabric, a filament feeding head rotatably mounted to rotate around the spindles, means for rotating the feeding head around the pair of spindles so as to form a winding of filamentary material around the spindles, a pair of helical members being provided, one helical member surrounding each spindle, the helical members being rotatable around the respective axes of the spindles simultaneously to move the winding along both spindles in synchronisation, means for driving the spindles in the opposite directions of rotation about their axes to those of the respective helical members, and means for applying adhesive material to the winding of filamentary material to form a sheet of fabric.

2. Apparatus according to claim 1 wherein the helical members each comprise a screw thread portion having at least one tie bar at the root of the screw thread.

3. Apparatus according to claim 2 wherein the helical members are each formed with an integral thin central tube of slightly larger diameter than the associated spindle, the central tube being partly cut-away to leave at least one narrow, thin, tie bar.

4. Apparatus according to claim 2 wherein the tie bar extends along the whole operative length of the helical member.

5. Apparatus according to claim 2 wherein two circumferentially-spaced tie bars are provided.

6. Apparatus according to claim 2 wherein the screw thread is of apex form in the region adjacent the winding head and the major portion is of square profile.

7. Apparatus according to claim 1 wherein the spindles are knurled.

8. Apparatus according to claim 1 wherein a cam or finger is provided in the plane of the filament feeding head to extend the adjacent filament loop.

9. Apparatus according to claim 1 wherein a cam or finger is provided in the plane of the filament feeding head to displace the winding on one spindle relative to the other so as to wind the filament at a bias angle.

10. Apparatus according to claim 1 wherein means is provided for coating the winding with rubber, comprising a parallel pair of rolls having a nip arranged so that the spindles are spaced-apart more widely than the width of the rolls and positioned so that the winding leaves the spindles and passes continuously into the nip.

11. A method for the manufacture of fabric comprising winding filamentary material around a pair of spaced-apart, longitudinally-extending rotating spindles, driving both edges of the winding along the spindles by means of helical members rotating around the spindles in the opposite direction of rotation to that of the spindles, applying adhesive material to the filamentary material, consolidating the winding and adhesive material to form a sheet of fabric and removing the fabric from the spindles.

12. Apparatus for the manufacture of tire reinforcement fabric plies comprising a pair of longitudinally-extending rotatable spindles mounted in spaced-apart, parallel relationship one for each edge of the fabric, a filament feeding head mounted for rotation about an axis parallel to and lying between the spindles, means for rotating the feeding head around the pair of spindles so as to form a winding of filamentary material around the spindles, a pair of helical members being provided, one helical member surrounding each spindle, each helical member comprising a screw thread portion having at least one tie bar at the root of the screw thread, the helical members being rotatable around the respective axes of the spindles simultaneously to move the winding along both spindles in synchronisation, means for driving the spindles in the opposite directions of rotation about their axes to those of the respective helical members, and means for applying adhesive material to the winding of filamentary material to form a sheet of fabric.

* * * * *